(12) United States Patent
Kyriakis

(10) Patent No.: US 10,816,329 B2
(45) Date of Patent: Oct. 27, 2020

(54) OUTLINE MEASUREMENT OF MOVING OBJECTS

(71) Applicant: Proton Products International Limited, Beaconsfield (GB)

(72) Inventor: John Kyriakis, Beaconsfield (GB)

(73) Assignee: Proton Products International Limited, Beaconsfield, Buckinghamshire (GB)

( * ) Notice: Subject to any disclaimer, the term of this patent is extended or adjusted under 35 U.S.C. 154(b) by 0 days.

(21) Appl. No.: 16/359,111

(22) Filed: Mar. 20, 2019

(65) Prior Publication Data
US 2020/0232788 A1 Jul. 23, 2020

(30) Foreign Application Priority Data
Jan. 23, 2019 (GB) .................................. 1900914.1

(51) Int. Cl.
*G01B 11/24* (2006.01)
(52) U.S. Cl.
CPC .................................... *G01B 11/24* (2013.01)
(58) Field of Classification Search
CPC ........... G01N 21/8915; G01N 21/8983; G01N 33/365; G01N 21/89; G01N 2021/8472; G01N 2021/8887; G01N 21/88; G01N 21/952; G01N 15/0612; G01N 15/1468; G01N 1/02; G01N 2001/028; G01N 2001/2833; G01N 2015/145; G01N 2021/1734; G01N 2021/1742; G01N 2021/4707; G01N 2021/8845;
(Continued)

(56) References Cited

U.S. PATENT DOCUMENTS

| 3,626,196 A | * | 12/1971 | Arnaudin, Jr. | ....... | G01N 21/952 |
| | | | | | 250/559.42 |
| 6,201,602 B1 | * | 3/2001 | Bouvyn | ............. | G01N 21/8915 |
| | | | | | 356/238.1 |

(Continued)

FOREIGN PATENT DOCUMENTS

| DE | 102011119658 A1 | 5/2013 |
| EP | 0364907 A2 | 4/1990 |

(Continued)

OTHER PUBLICATIONS

European Search Report for EP Appl No. 19000150, dated Feb. 20, 2020, 2 pages.

*Primary Examiner* — Michael P Stafira
(74) *Attorney, Agent, or Firm* — Maine Cernota & Rardin

(57) ABSTRACT

An apparatus for non-contact monitoring of travelling objects being produced in an unguided linear process comprising: a toroidal structure with an open aperture defining a measuring zone, a source of radiation configured by a plurality of radiation devices circumferentially disposed within the measuring zone whereby the radiation source emits rays that generate a planar screen of radiation across the object circumferentially to envelop the object, a plurality of circumferentially disposed recording devices for receiving radiation from the radiation devices following interception of the rays by the objects, and analysis means for analyzing imaging information of the emitted radiation recorded by the recording devices thereby to provide a measure of the physical characteristics of the object.

14 Claims, 5 Drawing Sheets

(58) Field of Classification Search
CPC ... G01N 2021/8864; G01N 2021/8896; G01N 2021/8908; G01N 2021/945; G01N 21/47; G01N 21/474; G01N 21/84; G01N 21/86; G01N 21/8851; G01N 21/94; G01N 2201/0612; G01N 2201/062; G01N 2201/08; G01N 2201/10; G01N 2201/102; G01N 2203/0023; G01N 2203/0282; G01N 27/24; G01N 33/34; G01N 33/36; G01N 33/367; G01N 3/20; G01B 11/02; G01B 11/024; G01B 11/14; G02B 6/04
See application file for complete search history.

(56) References Cited

U.S. PATENT DOCUMENTS

| | | | |
|---|---|---|---|
| 7,038,779 B2* | 5/2006 | Demarest | G01N 21/952 356/238.2 |
| 2015/0219617 A1* | 8/2015 | Storz | G01N 27/24 356/72 |

FOREIGN PATENT DOCUMENTS

| | | | |
|---|---|---|---|
| GB | 2003693 A | 3/1979 |
| GB | 2465024 A | 5/2010 |
| WO | 2015043554 A1 | 4/2015 |

\* cited by examiner

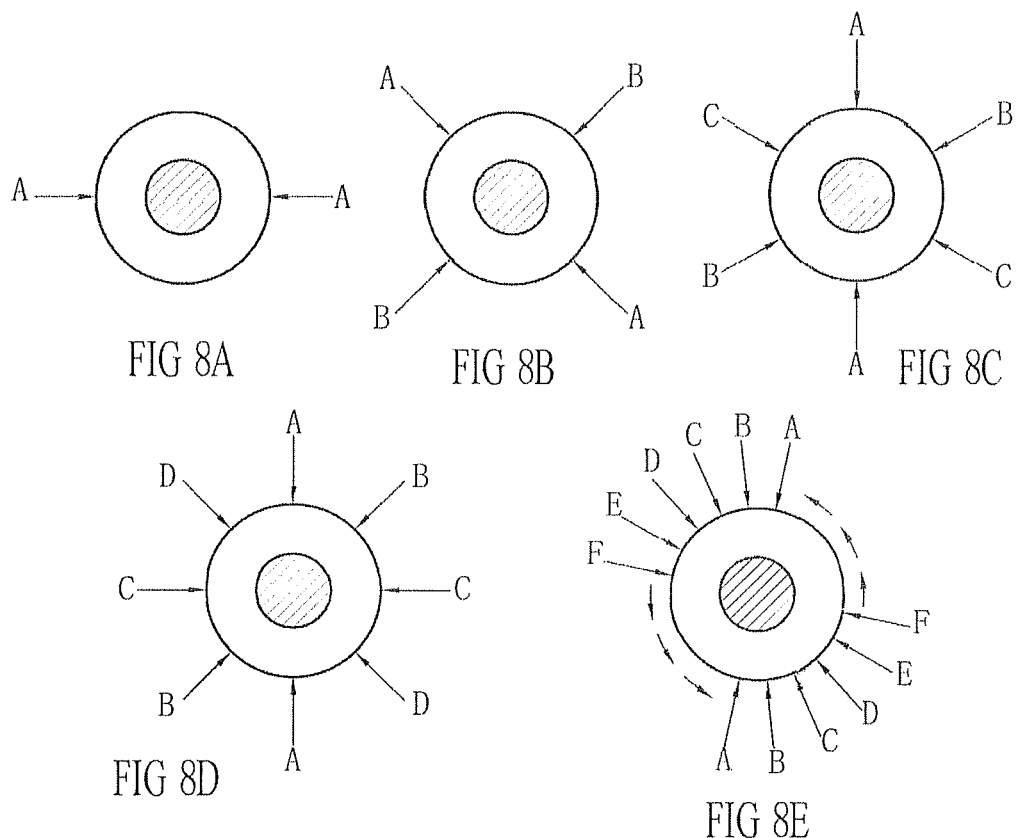
FIG 8A   FIG 8B   FIG 8C
FIG 8D   FIG 8E
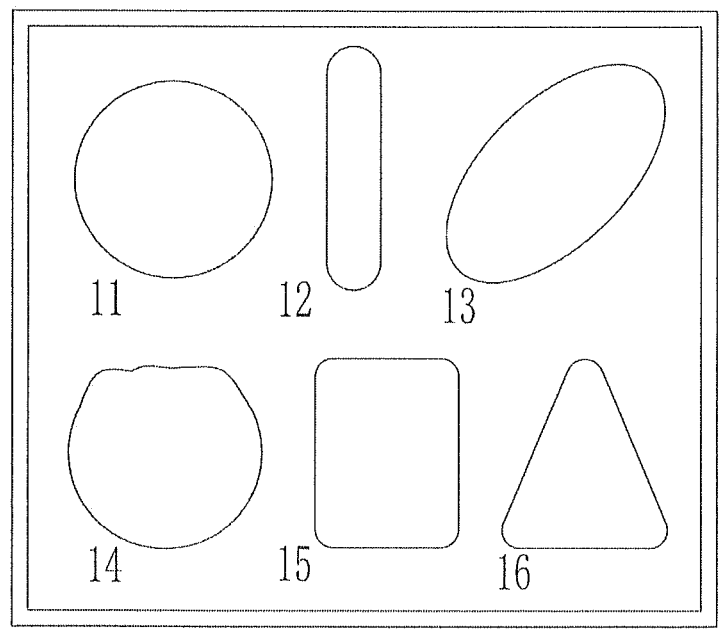
FIG 9

US 10,816,329 B2

OUTLINE MEASUREMENT OF MOVING OBJECTS

RELATED APPLICATIONS

This application claims priority to GB Application No. 1900914.1, filed Jan. 23, 2019. This application is herein incorporated by reference, in its entirety, for all purposes.

FIELD OF THE INVENTION

This invention relates to measurements of elongated objects which are produced by linear manufacturing methods, to determine the cross sectional external format and outline contour thereof.

BACKGROUND OF THE INVENTION

In the manufacture of objects of an elongated form such as wires, cables, ropes tubes, pipes, hoses and the like, there is a requirement to measure the external format and outline contour of these objects in order to confirm adherence to specific applications, maintain quality, as well as mechanical and/or electrical specifications. In most cases, these measurements are applied when these objects are being produced in processes involving extrusion machines, in the case of plastic cables, hoses, tubes etc., or drawing machines in the case of wires, metallic tubes and the like.

The fundamental measurement applied to linearly manufactured objects, is the diameter or size of the object and this is achieved preferably by optical, non-contact systems. Optical systems are also used to control the quality and outline contour condition of the objects, whereby the profile of an object is examined to ensure that there is no damage or faults, such as ridges valleys and the like, to the surface of the object.

Strict specification requirements apply to electric cables due to the fact they are current-carrying conductors.

Cables cover a wide range of sizes, from small diameter communication types of a few millimeters, to large power cables of up 300 mm diameters. All cables are manufactured in an extrusion process, in which a bare copper conductor is inserted in an extrusion machine that covers the bare conductor with an insulating material, such as plastic or rubber. This is a continuous linear process, operating at speeds appropriate to the cable type.

During the above process, the cable has to be monitored and controlled, in order to maintain constant the overall diameter of the extruded cable, as required by the application and usage specifications of the cable type. Prior art describes optical devices which measure the diameter of cables during manufacture, in one, two, three or four planes. These devices can also operate in a rocking to-and-fro motion or indeed rotate around the cable in order to measure the overall cable circumference.

It is to be noted, that due to the time taken to perform the rocking motion to-and-fro, or the rotation around the cable on a linear travelling cable, the results will be helical measurements, which are of limited use, mainly for general statistical or historical information.

SUMMARY OF THE INVENTION

An object of the present invention is to obviate drawbacks and problems of the prior art, by the use of optical measuring techniques and apparatus operating at very high frequency levels, in order to provide accurate external format, outline contour condition, as well as diameter or size over the complete, all-round surface of elongated objects, during the manufacturing process thereof.

According to the invention there is provided an apparatus for non-contact measurement of the physical characteristics of elongated objects, such as surface contour and dimensions, moving in an unguided, linear process comprising a toroidal structure having an entrance aperture defining an internal measuring zone, a source of radiation within the toroidal structure configured by a multiplicity of radiation devices, disposed circumferentially around the toroidal structure within the measuring zone, to provide a screen of radiation to envelop the object as it moves therethrough in the linear process, and a plurality of recording devices within the measuring zone, providing circumferential coverage overlap with the radiation devices and being adapted to analyze the imaging information of the emitted radiation from the object as it passes through the screen, representative of the physical characteristics of the object including its surface and dimensions.

In the following description of preferred embodiments of the invention reference will be made to cable extrusion processes, which require a high degree of performance accuracy.

However this does not preclude, in any way, the application and usage of the invention to other types of measurement in the manufacture of elongated objects other than by extrusion.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIGS. 8A, 8B, 8C, and 8D depict alternative methods of measurement of the physical characteristics of a travelling object in accordance with the prior art.

FIG. 8E illustrates measurement in accordance with an embodiment of the invention.

FIG. 9 shows various cross sectional views of differing travelling objects that may be measured for physical characteristics by the apparatus of the invention.

DETAILED DESCRIPTION

Figure 1:
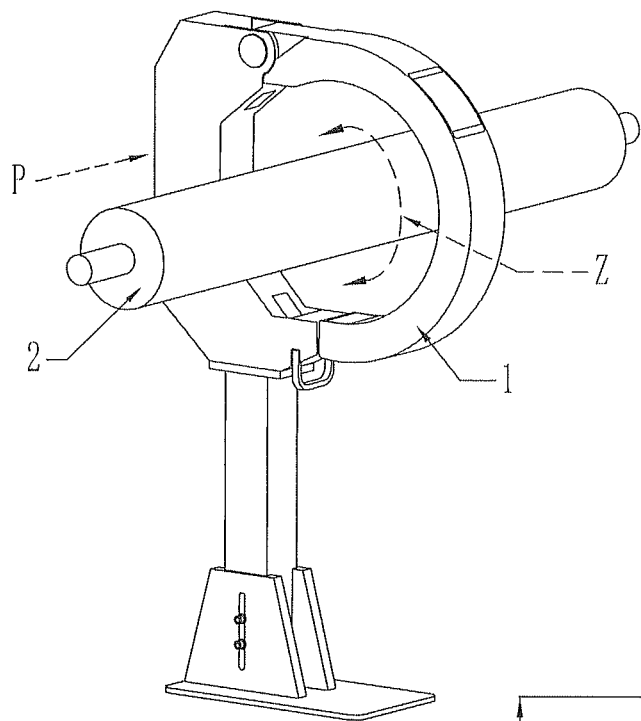
FIG. 1 shows the toroidal structure of the invention in perspective view.
Figure 2:
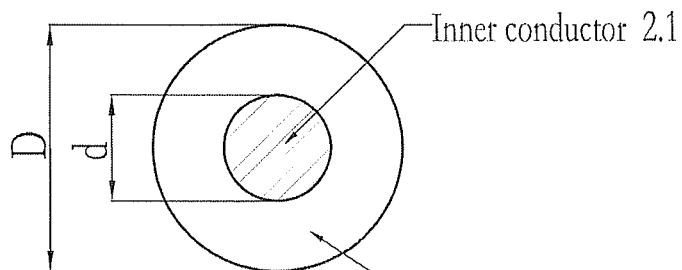
FIG. 2 shows a cross view of a typical cable to which the present invention may be employed as to measurement of physical characteristics thereof.

With reference to FIG. 1 of the drawings, an embodiment of the measuring apparatus of the invention is shown in the form of a toroidal structure 1 having an entrance aperture P defining an internal measuring zone Z. An electric cable 2 under monitor is shown travelling the entrance aperture P and the measuring zone Z of the toroidal structure 1. A cross sectional view of the cable 2 under test is shown in FIG. 2 having a copper conductor 2.1 of diameter d and an outer coating of plastic insulation 2.2 of overall diameter D.

Figure 3:
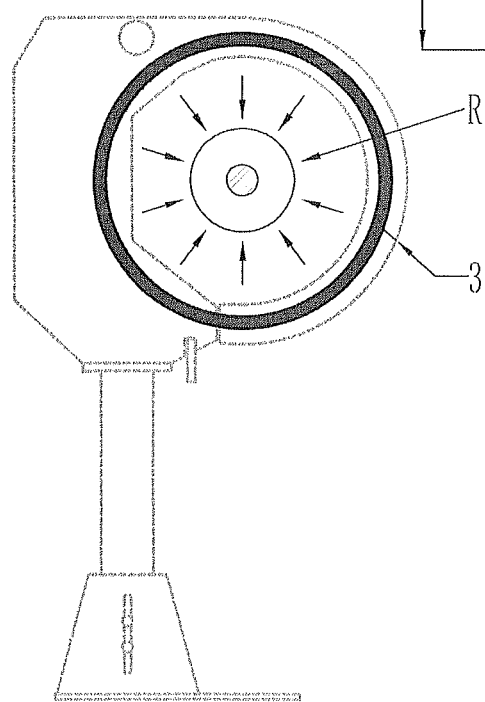
FIG. 3 shows the toroidal structure of FIG. 1 in use monitoring a travelling cable.
Figure 4B:
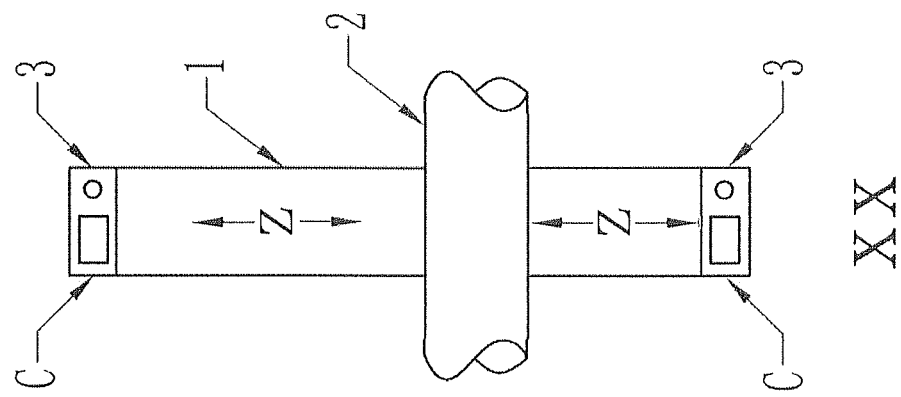
FIG. 4B shows specific design details of the toroidal structure of FIG. 1 in cross sectional view along XX of FIG. 4A.
Figure 4A:
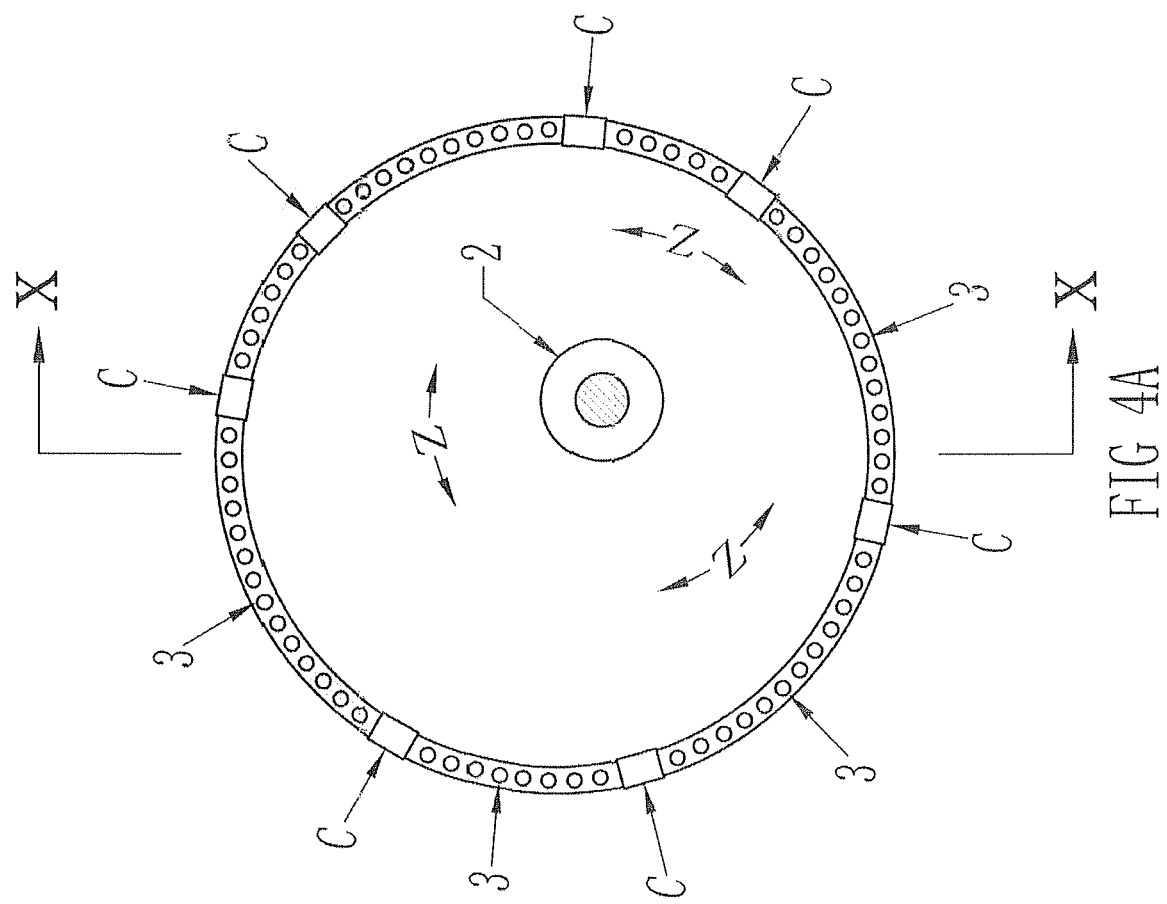
FIG. 4A shows further features of the toroidal structure of FIG. 1.

As shown in FIG. 3, the toroidal structure 1 is provided with a plurality of circumferentially mounted radiation emitting devices 3, which are more particularly shown in FIGS. 4A and 4B, that form, when in use, a screen of emitted radiation R that envelops the travelling cable 2.

Figure 5A:
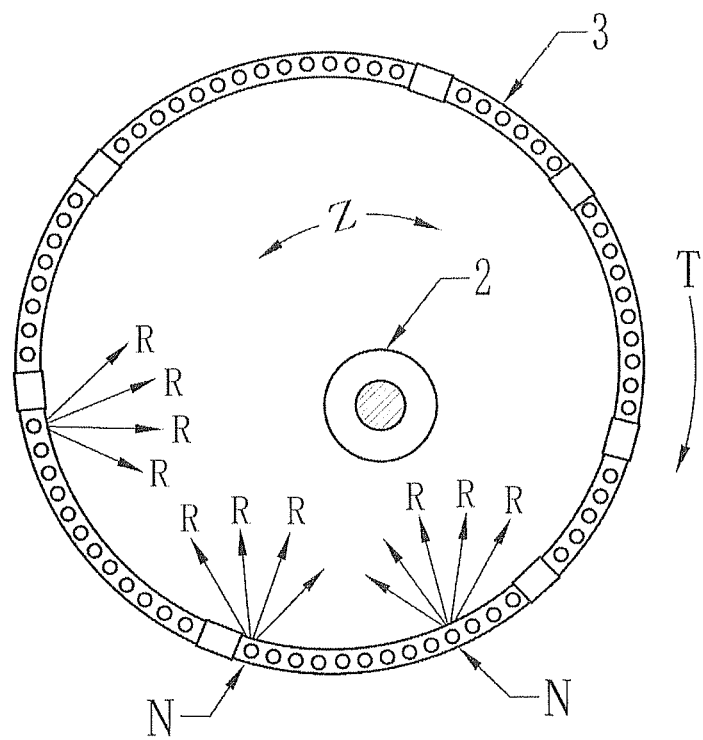
FIGS. 5A, 5B, 6 and 7 are cross sectional views of the toroid structure of FIG. 1 illustrating the workings of the invention.
Figure 5B:
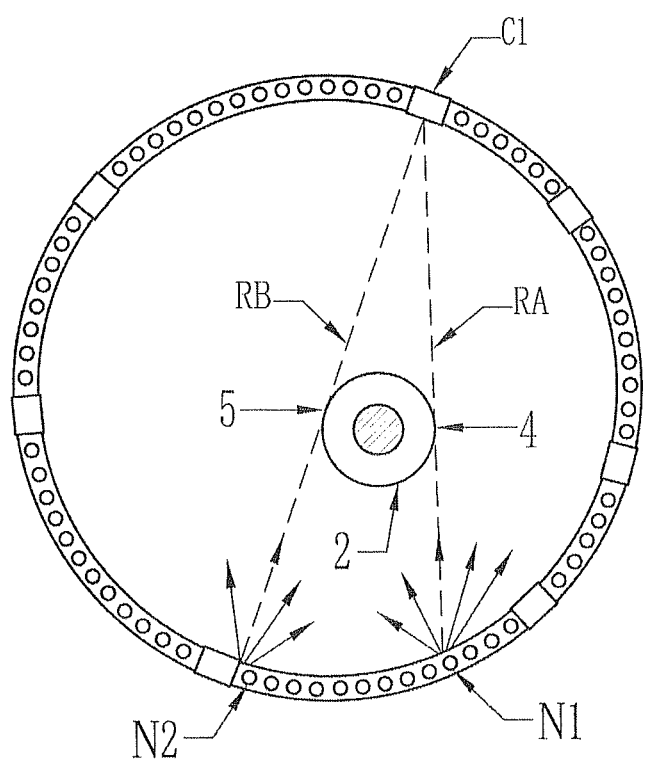

As shown in FIG. 5A and FIG. 5B, the radiation devices 3 provide a closed, circumferential ring of individual pixels N enveloping the cable 2 with radiation R within the measuring zone Z.

As shown in the cross-sectional view of the toroidal structure 1 depicted in FIG. 4B, a plurality of image recording devices C, such as CCD cameras and the like, are disposed in a closed, circumferential ring longitudinally adjacent the radiation emitting devices 3 inside the toroidal structure 1, whereby the image recording devices C and radiation emitting devices 3 are provided with an unrestricted view of cable 2 at all times, during the operation of the invention.

With reference to FIG. 5A, when the apparatus of the invention becomes functional, individual pixels N from radiation devices 3 are energized sequentially, and generate a screen of radiation of rays R that sweep zone Z in a clockwise manner T and simultaneously, recording devices C are energized in conjunction with radiation rays R, in order to provide positional corrections and physical characteristics of cable 2 within the measuring zone Z of toroidal structure 1.

Thus, with particular reference to FIG. 5B, when pixel N1 and a recording device C1 are energized simultaneously, pixel N1 generates radiation of multiple rays R (see FIG. 5A), one of which, RA, makes tangential contact with cable 1 at point 4 and proceeds to recording device C1.

In a similar manner, when pixel N2 is energized, it also generates rays R one of which, ray RB, makes tangential contact with cable 2 at point 5, and also proceeds to recording device C1. Recording device C1 measures the time lapse between the contact of ray RA with cable 2 at point 4 to the contact of ray RB with cable 2 at point 5.

Figure 6:
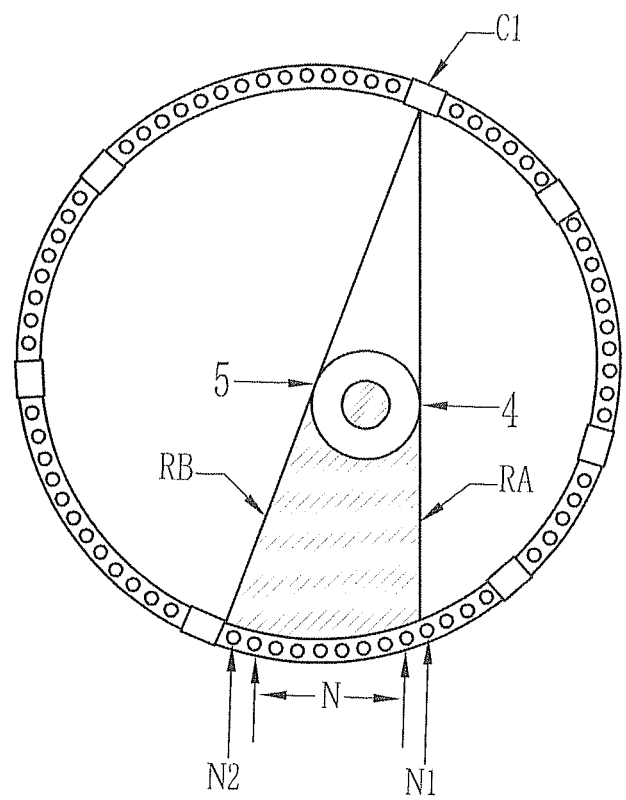

FIG. 6 illustrates the feature of the invention whereby recording devices C (e.g. C1) are adapted to identify and measure the time lapse between two successive rays R, such as said RA and RB, that have made tangential contact with cable 2 Rays R generated from pixels N located between pixels N1 and N2 are blocked by cable 2 and all other rays that have not made contact with cable 2 are rejected by recording devices C.

Figure 7:
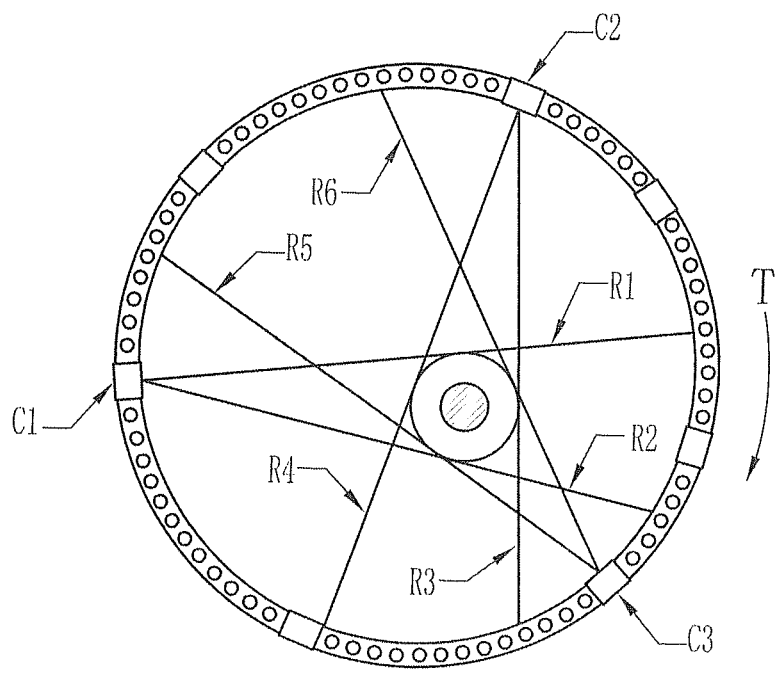

FIG. 7 shows a continuation of the above processes, whereby six rays, R1, R2, R3, R4, R5, and R6, encircle cable 2 within the measuring zone Z, making tangential connections to cable 2, and proceed to recording devices C1, C2, and C3 respectively, thus providing a complete overlap over the surface of cable 2, resulting in continuous, uninterrupted surface coverage of cable 2 at all times, ensuring accurate measurements throughout the operation of the invention.

The apparatus of the invention has an operational frequency rate of 3000 Hz (scans per second) to locate the position of the cable 2 within the aperture of measuring zone Z of the toroidal structure 1, and apply positional corrections to cable 2, in order to ensure that all measurements related to the cable 2 are accurate, irrespective of the position of cable 2 at any particular moment, within the aperture measuring zone Z.

By imaging analysis, the apparatus of the invention utilizes time-related functions from recording devices C, to determine the time lapse between the sequential points of the tangential contacts of the rays R with the cable 2, around the circumference of the cable 2.

A series of calculations are then performed to determine measurements of the external format, outline contour condition and diameter or size of the cable 2, continuously, as the cable 2 moves freely, unsupported vertically or horizontally within the aperture measuring zone Z, while being extruded and travelling at the same time in a linear motion.

With reference to FIGS. 8A, 8B, 8C, And 8D respectively, these illustrate, in accordance with the prior art, a single-plane diameter measurement AA disposed at 180 degrees around the cable 2, a two plane diameter measurement AA+BB disposed at 90 degrees around the cable 2, a three plane AA+BB+CC diameter measurement, disposed at 120 degrees around the cable 2, and a four plane diameter measurement AA+BB+CC+DD disposed at 45 degrees around the cable 2.

All the above measurements are performed at the same position, or spot, around the cable 2. It will be obvious to the person familiar in the art that there are sections between the spot measurements, around the surface of said cable 2, that pass through the measuring zone Z without being measured.

The advantage of present invention is that it has multiple plane capability, as shown in FIG. 8E, whereby the apparatus performs diameter measurements on the cable 2 across an increased number of sections AA+BB+CC+DD+FF, in contrast with the prior art, as it sweeps around the surface of cable 2 at the rate of 3,000 measurements per second, thereby ensuring continuous and complete surface coverage of cable 2. An actual example will further demonstrate the advantage of the present invention.

Let it be assumed that a cable manufacturing line is running at a speed of 600 m/min or 10 m/sec.

As discussed earlier, prior art optical devices are able to operate in a rocking to-and-fro motion or full rotational motion around the moving cable.

Let it be assumed that such optical devices take two seconds to perform one circumferential revolution around the cable. In two seconds, the cable manufacturing line will produce 20 meters of cable.

Therefore, one circumferential rotation in a prior art optical device will spread out measurements, in a helical form, over a cable 2 length of 20 meters. These measurements are of limited use, as mentioned previously in the discussion of the prior art. In contrast, the apparatus according to the present invention will, in 2 seconds, take 2×3000=6,000 measurements. The cable length of the above example is 20 m=20,000 mm and 20,000/6,000=3.3 mm.

Therefore, with the present invention one circumferential diameter measurement will take place every 3.3 mm of cable length, a considerable improvement over the prior art.

The invention as described in the preceding embodiments has the ability to provide control functions to the extrusion machines, whereby diameter deviations are used as feedback to effect speed adjustments to the extrusion machines, in order to maintain the preset diameter as required.

Dimensional measurements as well as cross-sectional outlines of all linearly manufactured objects, in embodiments, may be displayed on screen displays in real time and surface or contour imperfections, may be recorded for quality and statistical purposes.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. An apparatus for non-contact monitoring of travelling objects being produced in an unguided linear process, in order to determine their physical characteristics, comprising:
   a toroidal structure providing an entrance aperture defining an internal measuring zone of said structure through which the object passes in its path of travel,
   a source of radiation configured by a plurality of radiation devices circumferentially disposed in a closed, side-by-side ring formation within the measuring zone of the toroidal structure and being adapted to be energized to emit rays that generate a planar screen of radiation covering said aperture circumferentially to envelop said object within said measuring zone as the object travels therethrough,
   a plurality of radiation recording devices disposed within the measuring zone of the toroidal structure and configured to receive radiation from said radiation devices following interception of said rays by the objects moving through the measuring zone, said recording devices being circumferentially disposed at selected positions in said ring formation of said radiation devices and adjacent thereto; and
   an imaging analyzer configured to analyze imaging information of the emitted radiation recorded by said radiation recording devices thereby to provide a measure of the physical characteristics of said object.

2. The apparatus as claimed in claim 1 wherein said radiation recording devices are charge-coupled devices.

3. The apparatus as claimed in claim 2 wherein said radiation emitting devices and said charge-coupled devices are arranged in a juxtaposed, side by side relationship around said measuring zone.

4. The apparatus as claimed in claim 3 wherein said radiation emitting devices are configured to be sequentially energized to provide light rays that sweep said measuring zone thereby to generate said planar screen of radiation to scan the travelling objects.

5. The apparatus as claimed in claim 4 wherein said radiation recording devices are configured to be energized simultaneously with energization of said charge-coupled devices to enable the physical characteristics of the objects to be determined.

6. The apparatus as claimed in claim 1 wherein the radiation recording devices are configured to be responsive to light from diametrically opposed ones of the radiation devices thereby to provide multiple diameter measurements at successive cross sections of the cable as the cable moves through the measuring zone, thus resulting in improved measurement accuracy.

7. The apparatus as claimed in claim 1 wherein each of said plurality of radiation recording devices is configured to receive radiation from a plurality of radiation devices.

8. An apparatus for non-contact monitoring of travelling objects being produced in an unguided linear process, in order to determine their physical characteristics, comprising:
   a toroidal structure providing an entrance aperture defining an internal measuring zone of said structure through which the object passes in its path of travel,
   a source of radiation configured by a plurality of radiation devices circumferentially disposed within the measuring zone of the toroidal structure and being adapted to be energized to emit rays that generate a planar screen of radiation covering said aperture circumferentially to envelop said object within said measuring zone as the object travels therethrough,
   a plurality of radiation recording devices disposed within the measuring zone of the toroidal structure and configured to receive radiation from said radiation devices following interception of said rays by the objects moving through the measuring zone, said recording devices being circumferentially disposed at selected positions in said ring formation of said radiation devices and adjacent thereto; and
   an imaging analyzer configured to analyze imaging information of the emitted radiation recorded by said radiation recording devices thereby to provide a measure of the physical characteristics of said object,
   wherein each of said plurality of radiation recording devices is configured to receive radiation from a plurality of radiation devices.

9. The apparatus for non-contact monitoring of travelling objects being produced in an unguided linear process of claim 8 wherein the number of radiation emitting devices between recording devices varies.

10. The apparatus for non-contact monitoring of travelling objects being produced in an unguided linear process of claim 9 further comprising a hinge configured to allow a continuous portion of travelling object to be measured to be inserted into the measuring zone of the toroidal structure.

11. The apparatus for non-contact monitoring of travelling objects being produced in an unguided linear process of claim 8 further comprising a hinge configured to allow a continuous portion of travelling object to be measured to be inserted into the measuring zone of the toroidal structure.

12. An apparatus for non-contact monitoring of travelling objects being produced in an unguided linear process, in order to determine their physical characteristics, comprising:
   a toroidal structure providing an entrance aperture defining an internal measuring zone of said structure through which the object passes in its path of travel,
   a hinge forming a part of the toroidal structure and configured to allow a continuous portion of travelling object to be measured to be inserted into the measuring zone of the toroidal structure;
   a source of radiation configured by a plurality of radiation devices circumferentially disposed within the measuring zone of the toroidal structure and being adapted to be energized to emit rays that generate a planar screen of radiation covering said aperture circumferentially to envelop said object within said measuring zone as the object travels therethrough,
   a plurality of radiation recording devices disposed within the measuring zone of the toroidal structure and configured to receive radiation from said radiation devices following interception of said rays by the objects moving through the measuring zone, said recording devices being circumferentially disposed at selected positions in said ring formation of said radiation devices and adjacent thereto; and
   an imaging analyzer configured to analyze imaging information of the emitted radiation recorded by said radiation recording devices thereby to provide a measure of the physical characteristics of said object, wherein each of said plurality of radiation recording devices is configured to receive radiation from a plurality of radiation devices, and wherein the number of radiation emitting devices between recording devices varies.

13. The apparatus for non-contact monitoring of travelling objects being produced in an unguided linear process of claim 1 wherein the number of radiation emitting devices between recording devices varies.

14. The apparatus for non-contact monitoring of travelling objects being produced in an unguided linear process of claim 1 further comprising a hinge configured to allow a continuous portion of travelling object to be measured to be inserted into the measuring zone of the toroidal structure.

\* \* \* \* \*